United States Patent
Omori

(10) Patent No.: US 9,869,345 B2
(45) Date of Patent: Jan. 16, 2018

(54) THRUST BEARING

(71) Applicant: IHI CORPORATION, Tokyo (JP)

(72) Inventor: Naomichi Omori, Tokyo (JP)

(73) Assignee: IHI CORPORATION, Tokyo (JP)

(*) Notice: Subject to any disclaimer, the term of this patent is extended or adjusted under 35 U.S.C. 154(b) by 196 days.

(21) Appl. No.: 15/070,258

(22) Filed: Mar. 15, 2016

(65) Prior Publication Data

US 2016/0195128 A1    Jul. 7, 2016

Related U.S. Application Data

(63) Continuation of application No. PCT/JP2014/074508, filed on Sep. 17, 2014.

(30) Foreign Application Priority Data

Sep. 19, 2013   (JP) .................................. 2013-194441

(51) Int. Cl.
  *F16C 32/06*    (2006.01)
  *F16C 17/04*    (2006.01)

(52) U.S. Cl.
  CPC ........ *F16C 17/042* (2013.01); *F16C 2240/46* (2013.01); *F16C 2360/00* (2013.01)

(58) Field of Classification Search
  CPC . F16C 17/042; F16C 32/0677; F16C 2240/46
  See application file for complete search history.

(56) References Cited

U.S. PATENT DOCUMENTS

| 3,423,139 | A | * | 1/1969 | Baudry | ............... F16C 17/06 384/224 |
| 4,082,375 | A |   | 4/1978 | Fortmann | |
| 4,247,155 | A |   | 1/1981 | Fortmann | |
| 4,277,113 | A | * | 7/1981 | Heshmat | ............... F16C 17/024 384/124 |
| 4,315,359 | A | * | 2/1982 | Gray | ............... F16C 17/042 29/898.02 |
| 4,331,365 | A | * | 5/1982 | Miller, Jr. | ............. F16C 17/042 384/105 |

(Continued)

FOREIGN PATENT DOCUMENTS

| CN | 102753849 A | 10/2012 |
| DE | 30 13 630 A1 | 12/1980 |

(Continued)

OTHER PUBLICATIONS

International Search Report received for PCT Patent Application No. PCT/JP2014/074508 dated Oct. 28, 2014, 4 pages (2 pages of English Translation and 2 pages of PCT search report).

*Primary Examiner* — Phillip A Johnson

(57) ABSTRACT

A thrust bearing is a thrust bearing disposed facing a thrust collar provided on a rotary shaft and includes a top foil, a back foil and a base plate. The back foil includes a plurality of back foil pieces. The top foil includes a plurality of top foil pieces. In addition, a leading side of the top foil piece in the rotation direction of the rotary shaft is provided with a fixed part fixed to the base plate, the top foil piece is provided with a thin part in which a part is removed from the surface of the top foil piece facing the back foil piece, and the thin part extends from an outer circumferential edge to an inner circumferential edge or to a side edge of the top foil piece.

10 Claims, 7 Drawing Sheets

(56) References Cited

U.S. PATENT DOCUMENTS

| | | | |
|---|---|---|---|
| 4,462,700 | A | 7/1984 | Agrawal |
| 4,597,677 | A | 7/1986 | Hagiwara |
| 5,248,205 | A | 9/1993 | Gu et al. |
| 5,318,366 | A | 6/1994 | Nadjafi |
| 2004/0096130 | A1 | 5/2004 | Saville et al. |
| 2012/0207414 | A1 | 8/2012 | Kim |

FOREIGN PATENT DOCUMENTS

| | | | |
|---|---|---|---|
| EP | 2 910 802 | A1 | 8/2015 |
| JP | S53-076247 | A | 7/1978 |
| JP | S61-036726 | U | 3/1986 |
| JP | S63-013915 | A | 1/1988 |
| JP | S63-195412 | A | 8/1988 |
| JP | S64-000719 | U | 1/1989 |
| JP | H01-094618 | U | 6/1989 |
| JP | H01-109617 | U | 7/1989 |
| JP | H02-286908 | A | 11/1990 |
| JP | H03-042255 | Y2 | 9/1991 |
| JP | H10-331847 | A | 12/1998 |
| JP | 2002-195257 | A | 7/2002 |
| JP | 2003-148461 | A | 5/2003 |
| JP | 2005-155802 | A | 6/2005 |
| JP | 2006-183786 | A | 7/2006 |
| JP | 2009-185857 | A | 8/2009 |
| JP | 2009-264567 | A | 11/2009 |
| KR | 10-2008-0089838 | A | 10/2008 |
| WO | 2014/061698 | A1 | 4/2014 |

\* cited by examiner

THRUST BEARING

This application is a Continuation Application based on International Application No. PCT/JP2014/074508, filed Sep. 17, 2014, which claims priority on Japanese Patent Application No. 2013-194441, filed Sep. 19, 2013, the contents of both of which are incorporated herein by reference.

TECHNICAL FIELD

The present disclosure relates to a thrust bearing.

BACKGROUND

In the related art, as a bearing used for a high-speed rotating body, a thrust bearing is known which is disposed so as to face a thrust collar provided on a rotary shaft. As such a thrust bearing, a foil-type thrust bearing, namely a thrust foil bearing is well known. The bearing surface of the thrust foil bearing is formed of a flexible foil (thin metal sheet) in order to accept movement of the rotary shaft (movement in the axial direction of or inclination of the thrust collar) which occurs due to vibration or to impact, and the thrust foil bearing includes a foil structure which is provided under the bearing surface and flexibly supports the bearing surface.

As an example of the thrust foil bearing, a structure is known in which a circular ring-shaped (annular shaped) bearing surface is formed of a plurality of individual foil pieces (top foil pieces) obtained by dividing an annular sheet in the circumferential direction thereof, and a wave sheet-shaped foil piece (bump foil piece) supports each top foil piece (for example, refer to Patent Document 1). Each top foil piece (the thickness thereof is about 100 µm) is arranged at an inclination angle with respect to the thrust collar, and thereby a bearing clearance between the thrust collar and the top foil piece is formed in a wedge shape in side view. That is, the bearing clearance is formed so as to gradually decrease from the leading side toward the trailing side in the rotation direction of the thrust collar (the rotary shaft). Thus, when the thrust collar rotates from the large side (the leading side) toward the small side (the trailing side) of the bearing clearance, a lubricating fluid flows into a narrow part of the wedge-shaped bearing clearance, and the load capability of the thrust bearing is obtained.

Only the edge of the top foil piece on the leading side in the rotation direction of the thrust collar (the rotary shaft) is fixed to a base plate, and the edge is configured as a fixed edge. When a bearing load increases, in a state where the fixed edge (the edge on the leading side) is a fulcrum, the top foil piece moves so as to be horizontal (parallel to the supported surface of the thrust collar), the inclination angle thereof decreases, and at the time the inclination angle becomes about 0.1°, the thrust bearing generates the maximum load capability. In addition, the bump foil piece is arranged so that the ridge line of a peak thereof is parallel to the edge on the trailing side of the top foil piece, and only the edge of the bump foil piece on the trailing side in the rotation direction of the thrust collar (the rotary shaft) is fixed to the base plate. That is, the edge on the leading side of the bump foil piece is set to be a free end.

Since the bump foil piece is arranged and fixed in this way, the pressure of a fluid lubrication film formed at the top foil piece becomes high at the small side (the trailing side) of the bearing clearance. Thus, if this part is supported by a high rigidity, the load capability of the thrust bearing can be increased.

Patent Documents 2 to 4 disclose thrust bearings which include a top foil and a bump foil. Patent Document 5 discloses a thrust bearing which includes a bearing foil, and the bearing surface of the bearing foil is provided with an introducing groove.

DOCUMENT OF RELATED ART

Patent Document

[Patent Document 1] Japanese Unexamined Patent Application, First Publication No. H10-331847
[Patent Document 2] Japanese Unexamined Patent Application, First Publication No. 2005-155802
[Patent Document 3] Japanese Unexamined Patent Application, First Publication No. S63-195412
[Patent Document 4] Japanese Unexamined Utility Model Application No. H1-109617
[Patent Document 5] Japanese Unexamined Patent Application, First Publication No. 2006-183786

SUMMARY

Technical Problem

In the above-described thrust foil bearing structure, when the pressure of the fluid lubrication film acts on the top foil piece, the flexure (depression) of an intermediate portion in the radial direction between the inner circumferential edge (the inner end in the radial direction) and the outer circumferential edge (the outer end in the radial direction) of the top foil piece toward a back foil may increase, and the pressure of the fluid lubrication film at the intermediate portion may decrease and thus the load capability of the bearing may deteriorate.

That is, at the inner circumferential edge or the outer circumferential edge of the top foil piece, the pressure of the fluid lubrication film formed between the top foil piece and the thrust collar is close to the pressure (ambient pressure) of a fluid in the surroundings of the top foil piece. In contrast, at the intermediate portion in the radial direction between the inner circumferential edge and the outer circumferential edge of the top foil piece, the pressure of the fluid lubrication film is higher than the ambient pressure. If the fluid lubrication film has such pressure distribution, the intermediate portion may greatly bend (be depressed) toward the back foil compared to the inner circumferential edge side or the outer circumferential edge side of the top foil piece. At this time, the bearing clearance (the thickness of the fluid lubrication film) increases at the intermediate portion which greatly bends, and thereby the pressure of the fluid lubrication film at the intermediate portion may decrease, and the load capability of the bearing may deteriorate as described above.

In order to decrease the amount of flexure (depression) at the intermediate portion in the radial direction to prevent deterioration of the load capability, for example, it is conceivable that the thickness of the top foil piece is increased. However, in this case, the inclination flexibility in the circumferential direction of the top foil piece may be spoiled, and it may be difficult for the inclination angle of the top foil piece to become about 0.1°, which is close to the horizontal direction as described above. Accordingly, the maximum load capability of the bearing is not easily obtained, and thus the load capability may also deteriorate.

The present disclosure has been made in view of the above circumstances, and an object thereof is to provide an excellent thrust bearing which can prevent deterioration of the load capability thereof.

Solution to Problem

A first aspect of the present disclosure is a thrust bearing disposed so as to face a thrust collar provided on a rotary shaft, the thrust bearing including: a top foil disposed so as to face the thrust collar; a back foil disposed so as to face a surface of the top foil opposite to another surface of the top foil facing the thrust collar, and supporting the top foil; and an annular plate-shaped base plate disposed on a side of the back foil opposite to the top foil, and supporting the back foil. The back foil includes a plurality of back foil pieces arranged in a circumferential direction of the base plate. The top foil includes a plurality of top foil pieces disposed on the plurality of back foil pieces. In addition, a leading side of a top foil piece in a rotation direction of the rotary shaft is provided with a fixed part fixed to the base plate, the top foil piece is provided with a thin part in which a part is removed from a surface of the top foil piece facing a back foil piece, and the thin part extends from an outer circumferential edge to an inner circumferential edge or to a side edge of the top foil piece.

A second aspect of the present disclosure is that in the thrust bearing of the first aspect, the thin part includes a fixed part-side thin part formed in the fixed part and in a vicinity of the fixed part on a trailing side of the fixed part in the rotation direction of the rotary shaft and extending from the outer circumferential edge to the inner circumferential edge of the top foil piece.

A third aspect of the present disclosure is that in the thrust bearing of the first or second aspect, the fixed part includes a linear fixed edge positioned at a trailing side of the fixed part in the rotation direction of the rotary shaft. The back foil piece is formed of a wave sheet-shaped bump foil piece in which peak parts and valley parts are alternately formed, and is disposed so that an arrangement direction of the peak parts crosses with the fixed edge. In addition, the thin part includes a valley part-side thin part formed in a portion of the top foil piece facing a valley part and formed so as to be thinner than a portion of the top foil piece facing a peak part.

A fourth aspect of the present disclosure is that in the thrust bearing of the third aspect, the peak parts are formed so that the height of the peak parts gradually increases from the fixed edge side toward a trailing side of the back foil piece in the rotation direction of the rotary shaft.

A fifth aspect of the present disclosure is that in the thrust bearing of any one of the first to third aspects, each of support areas of the base plate, the support areas supporting the back foil pieces, is provided with an inclined surface whose height gradually increases from the fixed edge side toward an edge on a trailing side of the top foil piece in the rotation direction of the rotary shaft.

A sixth aspect of the present disclosure is that in the thrust bearing of the fifth aspect, the back foil piece is formed of a wave sheet-shaped bump foil piece in which peak parts and valley parts are alternately formed, and is disposed so that an arrangement direction of the peak parts is the same as an inclination direction of the inclined surface.

A seventh aspect of the present disclosure is that in the thrust bearing of the third, fourth or sixth aspect, an edge on a trailing side of the bump foil piece in the rotation direction of the rotary shaft is fixed to the base plate.

Effects

According to a thrust bearing of the present disclosure, since the thin part is formed extending from the outer circumferential edge to the inner circumferential edge or to the side edge of the top foil piece, the thin part of the top foil piece easily bends, and thus the top foil piece can easily bend in a range from the leading side to the trailing side thereof in the rotation direction of the rotary shaft, namely in the circumferential direction. On the other hand, since the top foil piece is almost not influenced in the radial direction by the thin part, the bending difficulty (the bending rigidity) thereof is almost not changed, and can be maintained to be equivalent to that before the thin part is formed. Thus, if a sheet material thicker than that in the related art is used for forming the top foil piece, while the bending easiness thereof in the circumferential direction is maintained to be equivalent to that in the related art, the top foil piece does not easily bend in the radial direction compared to the related art, and the flexure of the intermediate portion of the top foil piece toward the back foil can be limited. Therefore, deterioration of the load capability of the thrust bearing can be prevented.

DESCRIPTION OF EMBODIMENTS

Hereinafter, thrust bearings of the present disclosure are described in detail with reference to the drawings. In the following drawings, the scale of each member is appropriately changed in order to show each member in a recognizable size.

Figure 1:
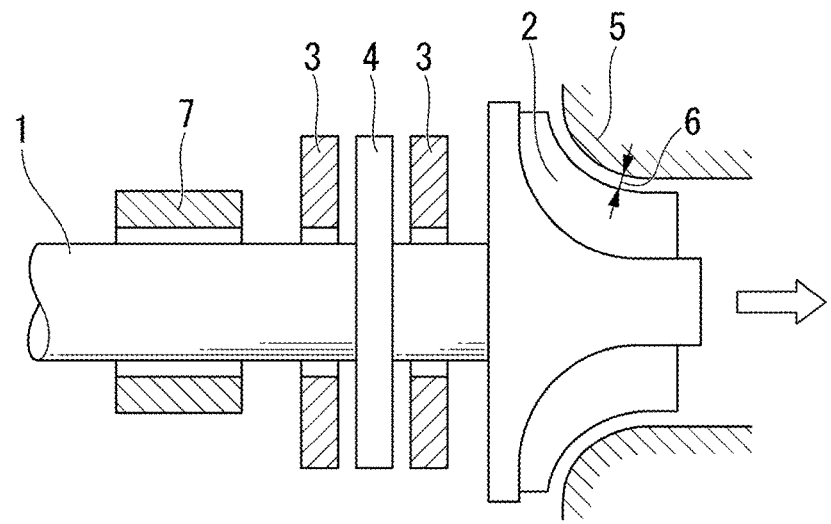
FIG. 1 is a schematic view showing an example of a turbo machine in which a thrust bearing of an embodiment of the present disclosure is provided.

FIG. 1 is a side view schematically showing an example of a turbo machine in which a thrust bearing of the present disclosure is provided. In FIG. 1, a reference numeral 1 represents a rotary shaft, a reference numeral 2 represents an impeller provided at an end part of the rotary shaft, and a reference numeral 3 represents the thrust bearing of the present disclosure.

A thrust collar 4 is fixed to the vicinity of the end of the rotary shaft 1, and the impeller 2 is formed at the end. A pair of thrust bearings 3 are disposed such that the thrust collar 4 is interposed therebetween.

The impeller 2 is disposed inside a housing 5 which is a stationary member, and a tip clearance 6 is formed between the impeller 2 and the housing 5.

A radial bearing 7 is provided on the rotary shaft 1 at a position closer to the middle of the rotary shaft 1 than the thrust collar 4.

Figure 2:
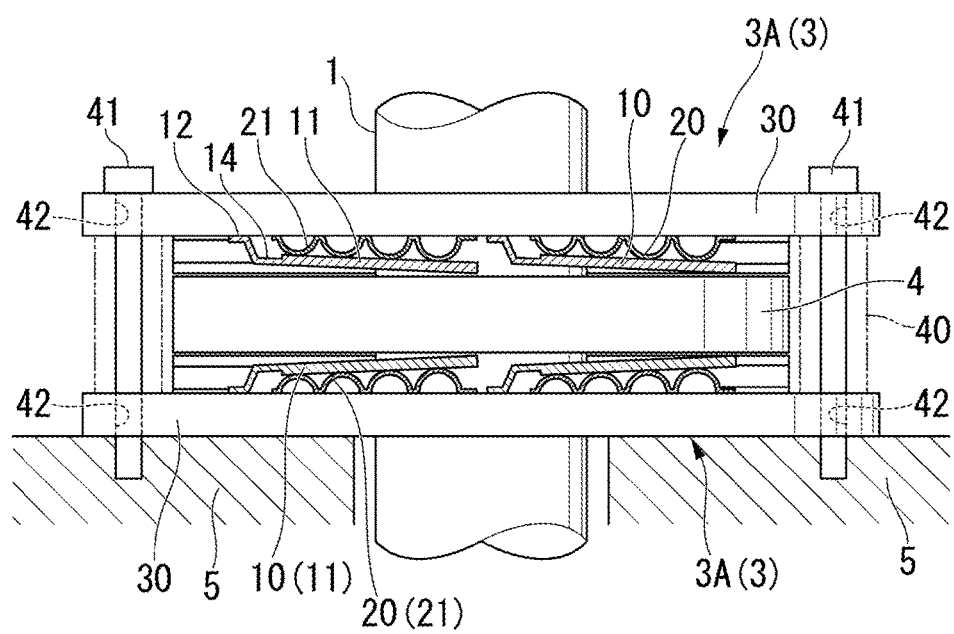
FIG. 2 is a view showing a thrust bearing of a first embodiment of the present disclosure, and is a side view of the thrust bearing in which a thrust collar is inserted.
Figure 3A:
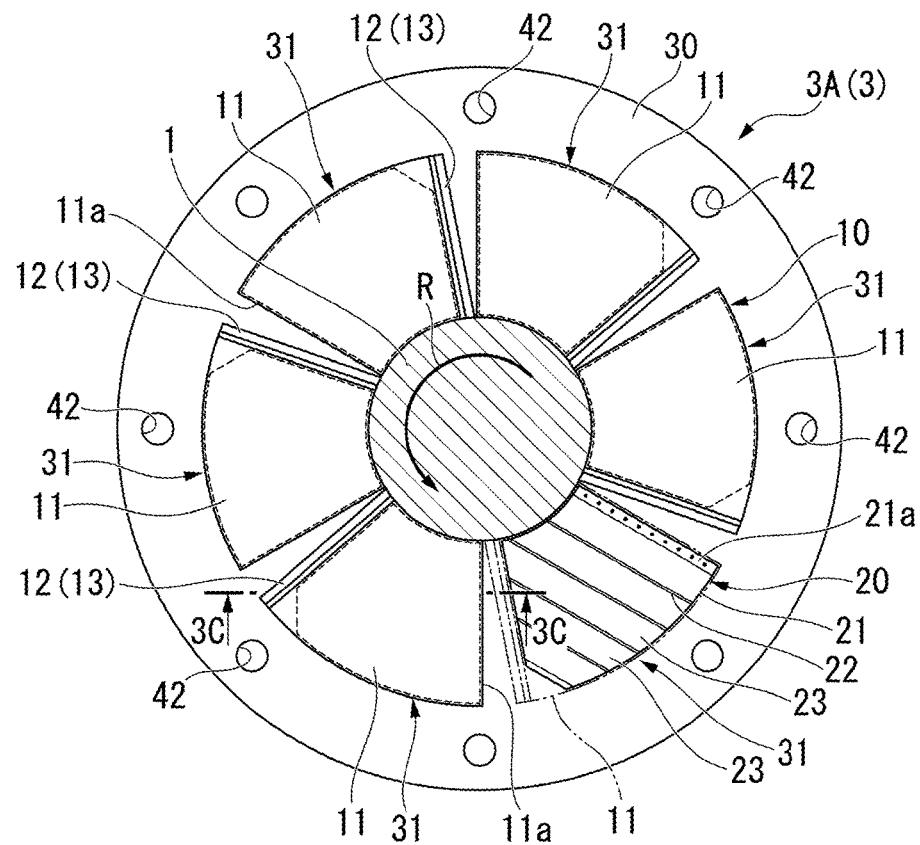
FIG. 3A is a view showing the thrust bearing of the first embodiment of the present disclosure, and is a partial cross-sectional plan view of the thrust bearing.
Figure 3B:
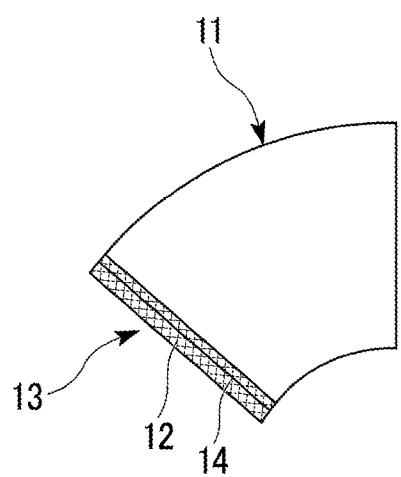
FIG. 3B is a plan view showing the rear surface of a top foil piece.
Figure 3C:
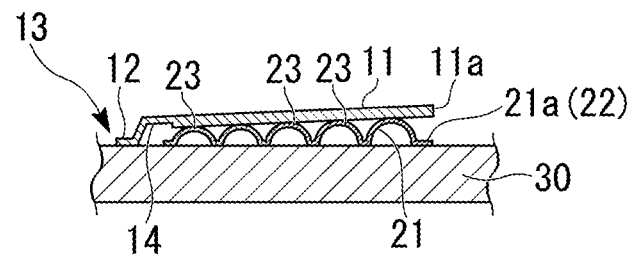
FIG. 3C is a cross-sectional view taken along 3C-3C line in FIG. 3A.
Figure 3D:
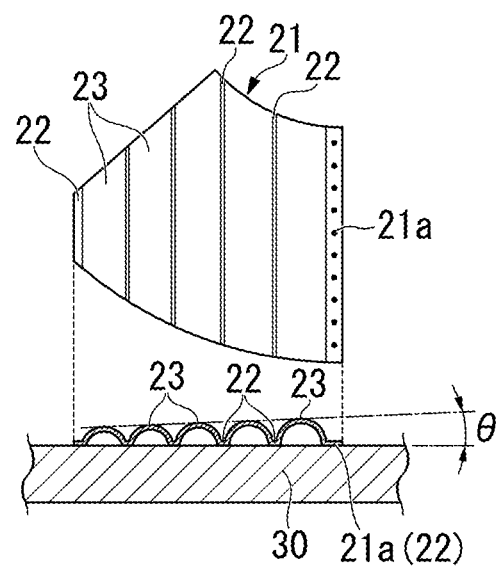
FIG. 3D is an explanatory view in which a plan view and a side view of a bump foil piece correspond to each other in order to show the shape of the bump foil piece.

FIGS. 2 and 3A to 3D are views showing a thrust bearing 3 of a first embodiment of the present disclosure provided in the turbo machine having the above configuration. FIG. 2 is a side view of the thrust bearing 3 in which the thrust collar 4 is inserted. FIG. 3A is a partial cross-sectional plan view of the thrust bearing 3. FIG. 3B is a plan view showing the rear surface (the surface facing a back foil) of a top foil piece. FIG. 3C is a cross-sectional view taken along 3C-3C line in FIG. 3A. FIG. 3D is an explanatory view in which a plan view and a side view of a bump foil piece correspond to each other in order to show the shape of the bump foil piece.

As shown in FIG. 2, in the first embodiment, thrust bearings 3A(3) are disposed on two sides of the thrust collar 4 such that the thrust collar 4 is interposed therebetween. The pair of thrust bearings 3A(3) have the same structure, and are annular shaped (cylindrical shaped) devices disposed so as to face the circular plate-shaped thrust collar 4 fixed to the rotary shaft 1. The thrust bearings 3A(3) are provided encircling the rotary shaft 1. Two surfaces (two surfaces opposite to each other in the axial direction of the rotary shaft 1) of the thrust collar 4 are configured as supported surfaces, and the pair of thrust bearings 3A(3) are disposed so as to face and support the two supported surfaces of the thrust collar 4.

The thrust bearing 3A includes a top foil 10 disposed so as to face the thrust collar 4, a back foil 20 disposed so as to face a surface of the top foil 10 opposite to another surface of the top foil 10 facing the thrust collar 4, and an annular plate-shaped base plate 30 disposed on a side of the back foil 20 opposite to the top foil 10.

In this embodiment, a cylindrical bearing spacer 40 shown by a dashed double-dotted line is interposed between the base plates 30 of the pair of thrust bearings 3A, and the base plates 30 are connected to each other via the bearing spacer 40 using fastening bolts 41. In addition, the outer surface of one base plate 30 is fixed to the housing 5 using the fastening bolts 41, and thus the pair of thrust bearings 3A are fixed to the housing 5 using the fastening bolts 41 in a state where the thrust collar 4 is interposed therebetween.

As shown in FIG. 3A, the base plate 30 is an annular plate-shaped metal member having a thickness of several millimeters, and an outer circumferential portion of the base plate 30 is provided with a plurality of through-holes 42 (the number thereof is eight in this embodiment) allowing the fastening bolts 41 to be inserted thereinto. The surface of the base plate 30 facing the thrust collar 4 is provided with a support area which supports the back foil 20 and the top foil 10. In this embodiment, as described later, the back foil 20 includes a plurality (six) of back foil pieces 21, and the top foil 10 includes a plurality (six) of top foil pieces 11. Accordingly, the base plate 30 is provided with six support areas 31 formed by dividing the surface of the base plate 30 into six areas (into equivalent six areas) in the circumferential direction thereof. It is noted that the six support areas 31 in this embodiment are areas on the design, and the surface of the base plate 30 including the support areas 31 is formed in a uniform and flat surface.

As shown in FIG. 2, a back foil piece 21 and a top foil piece 11 are disposed in this order on each support area 31, and are supported by the support area 31. The base plate 30, the back foil piece 21 and the top foil piece 11 are piled up in the axial direction of the rotary shaft 1.

As shown in FIGS. 3A, 3C and 3D, the back foil 20 is formed of the six back foil pieces 21 arranged in the circumferential direction of the base plate 30. The back foil pieces 21 are disposed on the support areas 31 of the base plate 30, and thus are arranged in the circumferential direction of the base plate 30. In addition, each of the back foil pieces 21 is formed to be slightly smaller than the top foil piece 11 (described later) in plan view, and therefore as shown in FIG. 3A, is covered with the top foil piece 11 at a position above the base plate 30 without being exposed to the thrust collar 4.

The back foil 20 including the back foil pieces 21 is formed of foils (thin sheets), and resiliently supports the top foil 10 (the top foil pieces 11). For the back foil 20, for example, it is possible to use a bump foil, a spring foil disclosed in Japanese Unexamined Patent Application, First Publication No. 2006-57652 or in Japanese Unexamined Patent Application, First Publication No. 2004-270904, a back foil disclosed in Japanese Unexamined Patent Application, First Publication No. 2009-299748, or the like. Although the spring foils disclosed in Japanese Unexamined Patent Application, First Publication No. 2006-57652 and in Japanese Unexamined Patent Application, First Publication No. 2004-270904, and the back foil disclosed in Japanese Unexamined Patent Application, First Publication No. 2009-299748 are foils used for a radial bearing, if each foil is developed in a flat shape and is formed in an annular sheet shape, the foil can be used for a thrust bearing.

In this embodiment, as shown in FIG. 3D, the back foil 20 is formed of a bump foil, and thus the back foil piece 21 is formed of a bump foil piece. In the back foil piece 21 (the bump foil piece), a foil (thin metal sheet) having a thickness of about several hundred micrometers is formed in a wave sheet shape through press molding, and as shown in FIG. 3D, the whole shape thereof is formed in an approximately pentagonal shape in plan view.

The back foil piece 21 formed in a wave sheet shape in the above way is formed such that valley parts 22 contacting the base plate 30 and peak parts 23 contacting the top foil piece 11 are alternately disposed. As shown in FIG. 3A, the valley parts 22 and the peak parts 23 are arranged in a direction orthogonal in plan view to the extending direction in which an edge 11a (described later) of the top foil piece 11 extends. In addition, the valley parts 22 and the peak parts 23 are arranged in a direction crossing the extending direction in which a fixed edge 12 of the top foil piece 11 extends. That is, the plurality of peak parts 23 are next to each other in plan view in a direction crossing with the extending direction of the fixed edge 12.

The valley parts 22 and the peak parts 23 are formed at approximately regular intervals. In addition, the height of the peak parts 23 is formed so as to increase at a constant rate from the fixed edge 12 side toward the opposite side of the back foil piece 21 to the fixed edge 12 (refer to FIG. 3C), namely toward the trailing side of the back foil piece 21 in the rotation direction of the rotary shaft 1 (the thrust collar 4) shown by an arrow R in FIG. 3A.

An edge 21a on the trailing side of the back foil piece 21 in the rotation direction of the rotary shaft 1 is disposed at approximately the same position in plan view as the edge 11a on the trailing side of the top foil piece 11 (described later) in the rotation direction of the rotary shaft 1. The back foil piece 21 is spot-welded (welded at points) on the base plate 30 in the forming direction of the valley part 22 serving as the edge 21a, and thus is fixed thereto.

At this time, since the entire edge 21a of the back foil piece 21 is formed of one continuous valley part 22, this entire valley part 22 can be easily welded on the base plate 30. Thus, the fixing of the back foil piece 21 through welding can be easily performed.

In addition, the fixing of the edge 21a to the base plate 30 can also be performed using fastening screws or the like other than spot-welding.

As shown in FIG. 3A, the top foil 10 is formed of six top foil pieces 11 arranged in the circumferential direction of the base plate 30. Each of the top foil pieces 11 is an arc sheet-shaped member obtained by dividing a circular annular sheet in the circumferential direction thereof, namely an arc sheet-shaped member in which a portion including the apex of a sector shape of a thin metal sheet (foil) having a thickness of several hundred micrometers is removed from the sector shape, and each of the inner circumferential edge (the inner end in the radial direction) and the outer circumferential edge (the outer end in the radial direction) thereof is formed in an arc.

The top foil pieces 11 having such a shape are disposed on the support areas 31 of the base plate 30 so as to cover the back foil pieces 21. The top foil pieces 11 are arranged at regular intervals in the circumferential direction of the base plate 30, and the top foil pieces 11 as a whole are disposed in an approximately annular sheet shape, thereby forming the top foil 10.

The top foil piece 11 is formed to be slightly smaller than the support area 31 in plan view and is formed to be slightly larger than the back foil piece 21 in plan view. Therefore, the top foil pieces 11 are disposed on the support areas 31 without contacting each other, and are disposed thereon so as to cover the top surfaces of the back foil pieces 21 without exposing the back foil pieces 21 to the thrust collar 4. However, the present disclosure is not limited thereto, and the top foil piece 11 may be formed in the same size as the back foil piece 21 in plan view, or may be formed to be smaller than the back foil piece 21 in plan view.

The top foil piece 11 includes a fixed part 13 on the leading side of the top foil piece 11 in the rotation direction of the rotary shaft 1 (the thrust collar 4), and is fixed to the base plate 30 through the fixed part 13. The fixing of the fixed part 13 to the base plate 30 is performed through spot-welding (welding at points) similarly to the edge 21a of the back foil piece 21. In addition, the fixing of the fixed part 13 to the base plate 30 can also be performed using fastening screws or the like other than spot-welding.

Although the fixed part 13 may be formed in a sheet shape or in a linear shape as long as the fixed part 13 is provided on the leading side of the top foil piece 11 in the rotation direction of the rotary shaft 1 (the thrust collar 4), in this embodiment, the fixed part 13 is configured as the fixed edge 12 formed in a linear shape having a width. That is, although the fixed part 13 and the fixed edge 12 in this embodiment are disposed in approximately the same position, the fixed edge of the present disclosure is configured as an edge positioned on the trailing side of the fixed part 13 in the rotation direction of the rotary shaft 1.

As shown in FIG. 3C, bending work is applied to the top foil piece 11 at the vicinity of the fixed edge 12, and thereby the top foil piece 11 is formed in a stepped shape so as to secure a height which is approximately the same as the height of the peak parts 23 of the back foil piece 21, and a portion of the top foil piece 11 closer to the edge 11a than the fixed edge 12 is placed on the peak parts 23.

On the other hand, the edge 11a (the trailing edge) side of the top foil piece 11 is configured as a free end merely supported by the peak parts 23 of the back foil piece 21 without being fixed to the base plate 30 or the like.

In this embodiment, as described above, the back foil piece 21 is disposed such that the valley parts 22 and the peak parts 23 of the back foil piece 21 are arranged in a direction crossing with the fixed edge 12 of the top foil piece 11. Accordingly, the valley parts 22 and the peak parts 23 extend in the longitudinal direction of the fixed edge 12 or the edge 11a of the top foil piece 11, and particularly extend to be parallel to the edge 11a. Thus, when the top foil piece 11 is placed on the back foil piece 21, the top foil piece 11 is disposed to incline at an initial inclination angle determined by the peak parts 23 of the back foil piece 21 such that the separation between the top foil piece 11 and the inner surface (the surface in which the support areas 31 are provided) of the base plate 30 gradually increases from the fixed edge 12 toward the edge 11a in the arrangement direction of the peak parts 23.

The initial inclination angle is an inclination angle of the top foil piece 11 to the base plate 30 when a load is zero. In addition, the inclination angle is an angle (inclination) θ determined by an increment of the height of the peak parts 23 of the back foil piece 21 as shown in FIG. 3D. The inclination angle is an angle between the top foil piece 11 and the inner surface of the base plate 30. In addition, the inclination angle is equal to the angle between the top foil piece 11 and the supported surface of the thrust collar 4. Thus, when the load increases, the peak parts 23 of the back foil piece 21 are pushed toward the base plate 30, and the entire back foil piece 21 is flattened, whereby the top foil piece 11 also moves toward the base plate 30, and the inclination angle θ becomes less than the initial inclination angle.

In this structure, the top foil piece 11 is disposed such that the edge 11a thereof extends in the extending direction of the valley part 22 or the peak part 23 of the back foil piece 21, and the back foil piece 21 is disposed such that the arrangement direction of the peak parts 23 is orthogonal to the edge 11a. Therefore, the height of the edge 11a of the top foil piece 11 from the base plate 30, which is configured as a free end, is approximately constant even when the inclination angle θ of the top foil piece 11 is the initial inclination angle or when a load is added to the back foil piece 21 via the top foil piece 11 due to the rotation of the thrust collar 4 and the inclination angle θ decreases.

The top foil piece 11 is provided with a fixed part-side thin part 14 (a thin part) which is formed in the fixed edge 12 (the fixed part 13) and in the vicinity of the fixed edge 12 of the top foil piece 11 as shown in FIG. 3B, namely in the fixed edge 12 and in the vicinity of the fixed edge 12 positioned on the trailing side of the fixed edge 12 in the rotation direction of the rotary shaft 1, in which a part is cut (removed) from the surface of the top foil piece 11 facing the back foil piece 21 through etching or the like. The fixed part-side thin part 14 is formed to be thinner than other parts of the top foil piece 11. In addition, electrochemical machining or the like may be used for forming the fixed part-side thin part 14 if distortion or the like does not occur in the top foil piece 11.

The fixed part-side thin part 14 is linearly formed in the longitudinal direction of the fixed edge 12, that is, is formed extending from the outer circumferential edge to the inner circumferential edge in the radial direction of the top foil piece 11, and is formed through etching or the like. It is preferable that the thickness of the fixed part-side thin part 14 be set to about 50% to 70% of the thickness (several hundred micrometers) of a portion of the top foil piece 11 in which the cutting process using etching is not performed. If the fixed part-side thin part 14 is formed to have this thickness, a portion of the top foil piece 11 on the trailing side of the fixed part-side thin part 14 in the rotation direction of the rotary shaft 1 can be easily moved.

The fixed part-side thin part 14 is formed so as not to be positioned right above the top (the ridge line) of the peak part 23 closest to the fixed edge 12 of the peak parts 23 of the back foil piece 21 shown in FIG. 3C. That is, the width of the fixed part-side thin part 14 is set and formed so that the fixed edge 12 is included within the fixed part-side thin part 14 and the fixed part-side thin part 14 is positioned between the fixed edge 12 and the top (the ridge line) of the peak part 23 closest to the fixed edge 12. Accordingly, a portion of the top foil piece 11 other than the fixed part-side thin part 14 is placed on all the peak parts 23 and is evenly supported thereby, and thus the inclination angle θ shown in FIG. 3D is maintained. In addition, since the fixed part-side thin part 14 is formed, a portion of the top foil piece 11 closer to the edge 11a than the fixed part-side thin part 14 can easily and smoothly move (that is, the inclination angle thereof is easily changed). Furthermore, since the fixed part-side thin part 14 is formed and thus the top foil piece 11 can be easily rotated, the thickness of a portion of the top foil piece 11 other than the fixed part-side thin part 14 can be increased compared to that in the related art.

Next, the operation of the thrust bearing 3A(3) having the above configuration is described.

In this embodiment, as shown in FIG. 2, the thrust bearings 3A are provided on two sides of the thrust collar 4. Since the thrust bearings 3A are provided on two sides of the thrust collar 4 in this way, the movement amount of the thrust collar 4 (the rotary shaft 1) in the thrust direction can be minimized. That is, since the thrust movement amount thereof is decreased, it is possible to prevent the impeller 2 or the like from contacting the housing 5 even if the tip clearance 6 shown in FIG. 1 is narrowed, and to improve the fluid performance of a turbo machine or the like by narrowing the tip clearance 6.

In order to minimize the movement amount in the thrust direction, both thrust bearings 3A are disposed to be close to the thrust collar 4 without forming a large gap therebetween. Accordingly, the top foil pieces 11 (the top foils 10) of both thrust bearings 3A are brought into a state of being slightly pressed on the thrust collar 4. In this case, since the top foil piece 11 is provided with the fixed part-side thin part 14 in this embodiment, a portion of the top foil piece 11 close to the edge 11a is configured to easily incline (to easily move). Therefore, the pressing force which occurs in proportion to the pressing amount becomes small, and thus the starting torque of the rotary shaft 1 becomes small.

In the related art, an inclination angle greater than an optimum angle is applied to a top foil piece in advance in order that the inclination angle of the top foil piece becomes the optimum angle when the load added to the bearing increases. Thus, in a state where the rotation thereof stops, two top foil pieces contact two surfaces of the thrust collar 4, and are brought into a state of being pressed on the thrust collar 4 (a state where a preload is added thereto). However, since the thickness of the top foil piece is constant in the related art, the pressing force (preload) on the thrust collar 4 may become high, and the starting torque of the rotary shaft 1 may become large.

In contrast, in this embodiment, since the top foil piece 11 is provided with the fixed part-side thin part 14 as described above, the starting torque becomes small.

When the rotary shaft 1 rotates in this state and the thrust collar 4 starts rotating, while the thrust collar 4 and the top foil piece 11 rub on each other, an ambient fluid is pushed into a wedge-shaped space (a bearing clearance) in side view formed therebetween. When the rotation speed of the thrust collar 4 reaches a constant rotation speed, a fluid lubrication film is formed therebetween. The top foil pieces 11 (the top foil 10) are pressed on the back foil pieces 21 (the back foil 20) due to the pressure of the fluid lubrication film, and the thrust collar 4 leaves a state of contacting the top foil pieces 11 and rotates in a non-contact state with the top foil pieces 11.

When a thrust load is added to the bearing, the top foil piece 11 is further pressed on the back foil piece 21, and the inclination angle θ of the top foil piece 11 decreases. At this time, since the top foil piece 11 rotates (bends) around the fixed edge 12 on the leading side of the top foil piece 11 in the rotation direction of the rotary shaft 1, a portion of the top foil piece 11 on the trailing side of the fixed part-side thin part 14 in the rotation direction of the rotary shaft 1, namely a portion of the top foil piece 11 close to the edge 11a, easily and smoothly moves due to the fixed part-side thin part 14. Thus, even when the thrust load further increases and the thickness of the fluid lubrication film further decreases, the top foil piece 11 does not easily contact the thrust collar 4, and the optimum inclination angle thereof can be easily obtained.

In the thrust bearing 3A(3) of this embodiment, since the fixed part-side thin part 14 is formed in the fixed edge 12 and in the vicinity of the fixed edge 12 of the top foil piece 11 on the trailing side of the fixed edge 12 in the rotation direction, a portion of the top foil piece 11 close to the edge 11a can easily and smoothly move when a load is added to the bearing, and thus the starting torque of the rotary shaft 1 decreases. In addition, after the rotary shaft 1 starts rotating, since the top foil piece 11 also easily and smoothly rotates around the fixed part-side thin part 14, the optimum inclination angle of the top foil piece 11 can be easily obtained, and the load capability of the bearing improves.

Since the pressure of the fluid lubrication film becomes high when the bearing receives a high thrust load, a portion of the top foil piece 11 which is not directly supported by the back foil piece 21, namely a portion positioned right above the valley part 22 of the back foil piece 21, may bend, and the pressure may escape therefrom and the load capability may deteriorate.

However, since the fixed part-side thin part 14 is formed in the fixed edge 12 (in the fixed edge 12 and in the vicinity thereof) of the top foil piece 11 in this embodiment, it is possible to increase the thickness of a sheet material (a thin sheet) forming the top foil piece 11 compared to that in the related art without preventing the movement (the bending) of the top foil piece 11.

Thus, if the thickness of the top foil piece 11 is increased in this way, the flexure of a portion of the top foil piece 11 which is not supported by the back foil piece 21 can be decreased, and the deterioration of the load capability can be limited.

Next, a thrust bearing of a second embodiment of the present disclosure is described.

Figure 4A:
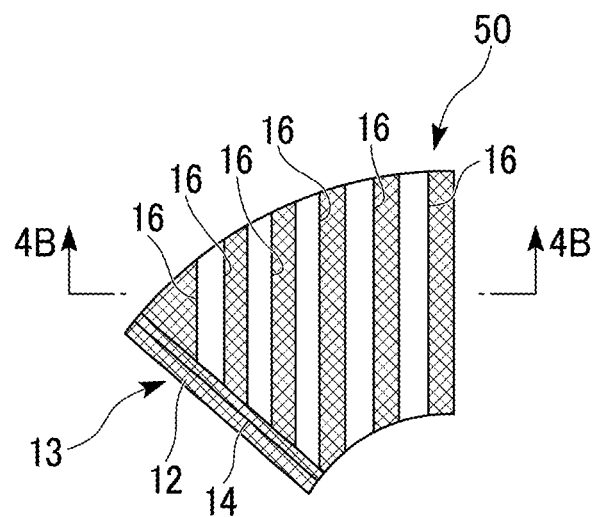
FIG. 4A is a view showing a thrust bearing of a second embodiment of the present disclosure, and is a plan view showing the rear surface of a top foil piece.
Figure 4B:
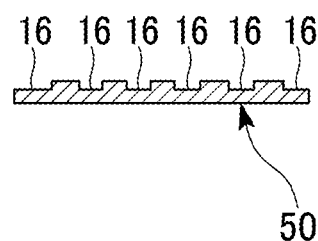
FIG. 4B is a cross-sectional view taken along 4B-4B line in FIG. 4A.
Figure 4C:
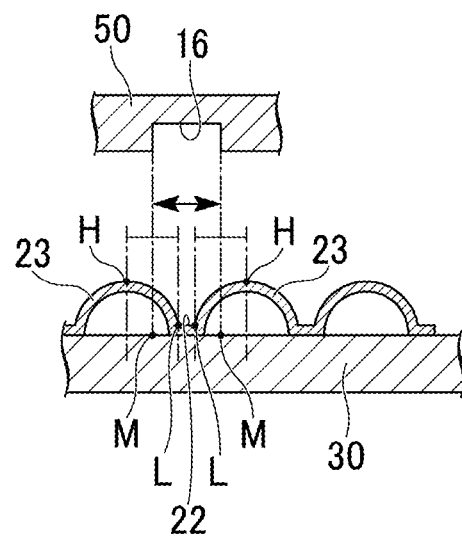
FIG. 4C is an explanatory view of a valley part-side thin part.

A main difference of the thrust bearing of the second embodiment from the thrust bearing 3A(3) of the first embodiment is that the structure shown in FIGS. 4A to 4C is used for a top foil piece. FIG. 4A is a plan view showing the rear surface of a top foil piece 50. FIG. 4B is a cross-sectional view taken along 4B-4B line in FIG. 4A. FIG. 4C is an explanatory view of a valley part-side thin part.

A difference of the top foil piece 50 shown in FIGS. 4A to 4C from the top foil piece 11 shown in FIGS. 3A to 3D is that a valley part-side thin part 16 (a thin part) is formed at a portion of the top foil piece 50 facing the valley part 22 of the back foil piece 21 shown in FIG. 3D and is formed to be thinner than a portion of the top foil piece 50 facing the peak part 23. In addition, since a plurality of valley parts 22 are provided, a plurality of valley part-side thin parts 16 are formed in the top foil piece 50.

The valley part-side thin part 16 is formed in a groove shape extending from the outer circumferential edge to the inner circumferential edge or to a side edge of the top foil piece 50, and is formed through etching or the like similarly to the fixed part-side thin part 14. The side edge is one of two edges in the circumferential direction of the top foil piece 50. In this embodiment, some (three in this embodiment) of the plurality of valley part-side thin parts 16 extend from the outer circumferential edge to the inner circumferential edge of the top foil piece 50, and the others (three in this embodiment) thereof extend from the outer circumferential edge to the side edge of the top foil piece 50 (refer to FIG. 4A). Additionally, it is preferable that the valley part-side thin part 16 be set to have a thickness equivalent to that of the fixed part-side thin part 14. Thus, in this embodiment, etching is performed on the sheet material of the top foil piece 50 one time, and the fixed part-side thin part 14 and the valley part-side thin parts 16 are formed at the same time.

However, the valley part-side thin part 16 may be formed to have a different thickness from that of the fixed part-side thin part 14. In this case, the etching for forming the fixed part-side thin part 14 and the etching for forming the valley part-side thin part 16 are performed at different times.

The above-described portion of the top foil piece 50 facing the valley part 22 of the back foil piece 21 is shown by, for example, the following definition.

As shown in FIG. 4C, the top of the peak part 23 of the back foil piece 21 is represented by a reference sign H, the position of the peak part 23 contacting the valley part 22, namely the borderline (the connection part) between the peak part 23 and the valley part 22, is represented by a reference sign L, and the middle point between the top H and the borderline L on the base plate 30 is represented by a reference sign M. In this case, a portion of the top foil piece 50 corresponding in the up-and-down direction of FIG. 4C to the area between two middle points M between which the valley part 22 is interposed is regarded as a portion of the top foil piece 50 facing the valley part 22. Thus, as shown in FIG. 4C, the portion of the top foil piece 50 corresponding to the area between the middle points M is provided with the valley part-side thin part 16. In addition, although FIG. 4C shows that the valley part 22 has a width, in a case where the valley part 22 is a mere bent part and has no width, only one borderline L is set between the peak parts 23 next to each other (this borderline L is positioned at the connection part between the peak parts 23 next to each other), and the above definition can also be used.

In this embodiment, since the fixed part-side thin part 14 is formed similarly to the first embodiment, it is possible to increase the thickness of the sheet material forming the top foil piece 50 compared to that in the related art.

When the pressure of the fluid lubrication film acts on the top foil piece 50, the intermediate portion in the radial direction between the inner and outer circumferential edges of the top foil piece 50 may easily bend toward the back foil 20. If this flexure increases, the pressure of the fluid lubrication film at the intermediate portion may decrease, and the load capability of the bearing may deteriorate.

Since the valley part-side thin part 16 is formed in this embodiment, the top foil piece 50 easily bends in a range from the leading side to the trailing side thereof in the rotation direction of the rotary shaft 1, namely in the circumferential direction (that is, the top foil piece 50 easily bends around an axis extending in parallel to the surface of the top foil piece 50 and in the radial direction), and the bending difficulty (the bending rigidity) of the top foil piece 50 in the radial direction (namely, the bending difficulty around an axis which is parallel to the surface of the top foil piece 50 and is orthogonal to the radial direction) is maintained to be equivalent to that before the valley part-side thin part 16 is formed. Therefore, if a sheet material thicker than that in the related art is used for forming the top foil piece 50, while the bending easiness in the circumferential direction can be maintained to be equivalent to that in the related art, the top foil piece 50 does not easily bend in the radial direction compared to the related art, and the flexure of the intermediate portion of the top foil piece 50 toward the back foil 20 can be limited.

Consequently, in this embodiment, the flexure of the intermediate portion in the radial direction is limited, and thereby it is possible to prevent the load capability from deteriorating due to a decrease in the pressure of the fluid lubrication film at the intermediate portion.

Next, a thrust bearing of a third embodiment of the present disclosure is described.

Figure 5A:
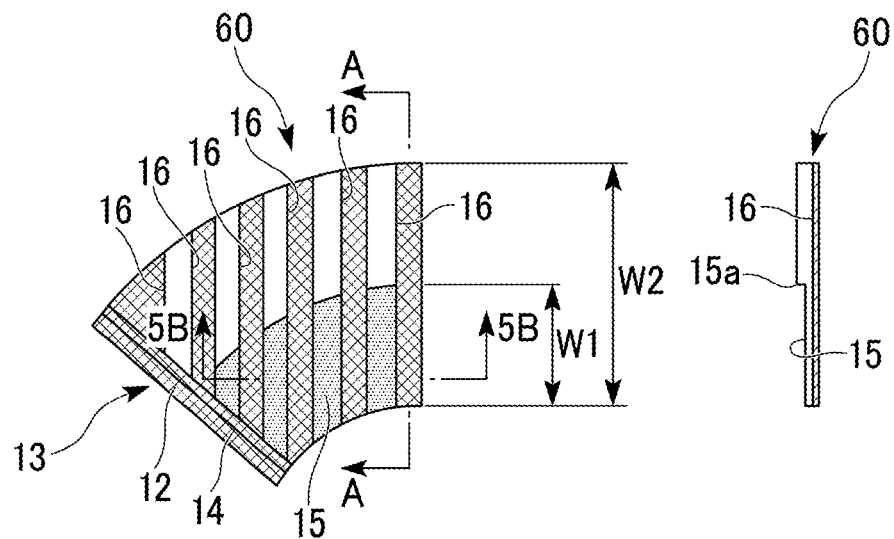
FIG. 5A is a view showing a thrust bearing of a third embodiment of the present disclosure, and is an explanatory view in which a plan view showing the rear surface of and a side view of a top foil piece correspond to each other.
Figure 5B:
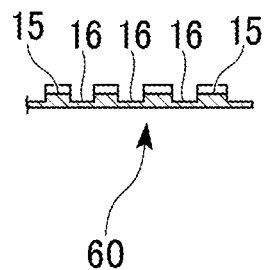
FIG. 5B is a cross-sectional view taken along 5B-5B line in FIG. 5A.

A main difference of the thrust bearing of the third embodiment from the thrust bearing of the second embodiment is that the structure shown in FIGS. 5A and 5B is used for a top foil piece. FIG. 5A is an explanatory view in which a plan view showing the rear surface of a top foil piece 60 and a side view (a cross-sectional view taken along A-A line in the plan view) thereof correspond to each other. FIG. 5B is a cross-sectional view taken along 5B-5B line in FIG. 5A.

A difference of the top foil piece 60 shown in FIGS. 5A and 5B from the top foil piece 50 shown in FIGS. 4A to 4C is that an inner circumferential edge-side thin part 15 as shown by hatching in FIG. 5A is formed at the inner circumferential edge side of the top foil piece 60 by cutting (removing) a part from the surface of the top foil piece 60 facing the back foil piece 21 through etching or the like, and is formed to be thinner than the outer circumferential edge side thereof. It is noted that in this embodiment, the inner circumferential edge-side thin part 15 is formed at a position different from the valley part-side thin part 16, namely between the valley part-side thin parts 16 next to each other. In addition, the term "inner circumferential edge side" denotes a portion of the top foil piece 60 close to the inner circumferential edge thereof (or a portion thereof including the inner circumferential edge), and the term "outer circumferential edge side" denotes a portion of the top foil piece 60 close to the outer circumferential edge thereof (or a portion thereof including the outer circumferential edge).

Since the inner circumferential edge-side thin part 15 having the above structure is formed therein, the inner circumferential edge side of the top foil piece 60 easily bends compared to the outer circumferential edge side thereof.

In this embodiment, a borderline 15a between the inner circumferential edge-side thin part 15 and the outer circumferential edge side thereof, namely a stepped part, is formed in an arc shape extending in the circumferential direction of the inner circumferential edge or the outer circumferential edge of the top foil piece 60.

It is preferable that the width W1 of the inner circumferential edge-side thin part 15 in the radial direction of the top foil piece 60 be set to ½ or less of the width W2 in the radial direction of the entire top foil piece 60, because as described later, the outer circumferential edge side of the top foil piece 60 can operate similarly to the related art while rising of the inner circumferential edge side of the top foil piece 60 toward the thrust collar 4 is limited. In addition, it is preferable that the width W1 be set to ⅛ or less of the width W2 in order that the rising of the inner circumferential edge side of the top foil piece 60 toward the thrust collar 4 is reliably prevented.

It is sufficient that the cut amount of the inner circumferential edge-side thin part 15, namely the difference in thickness between the inner circumferential edge-side thin part 15 and the outer circumferential edge side thereof, is about 10 to 20 µm. The top foil piece 60 is cut by this amount, and the inner circumferential edge-side thin part 15 is formed to be thinner than a portion of the outer circumferential edge side other than the fixed part-side thin part 14 or the valley part-side thin part 16 by about 10 to 20 µm, whereby a gap corresponding to the difference can be formed between the inner circumferential edge-side thin part 15 and the top of the peak part 23 of the back foil piece 21. This gap influences the fluid lubrication film formed between the thrust collar 4 and the top foil piece 60, and the fluid lubrication film thereat is sufficiently thin. Therefore, the gap sufficiently works even when it is about 10 to 20 µm. Additionally, if the cut amount is such a value, it is possible to suitably limit the rising of the inner circumferential edge side of the top foil piece 60 toward the thrust collar 4 without causing the inner circumferential edge side to very easily bend.

The inner circumferential edge-side thin part 15 is also formed through etching or the like similarly to the fixed part-side thin part 14 or the valley part-side thin part 16. However, as described above, since it is preferable that the fixed part-side thin part 14 and the valley part-side thin part 16 have an equivalent thickness and that the cut amount of the inner circumferential edge-side thin part 15 be less than that of the fixed part-side thin part 14 or the valley part-side thin part 16, in this embodiment, etching is performed on the sheet material of the top foil piece 60 two times. For example, the valley part-side thin parts 16 and the fixed part-side thin part 14 are formed in the same etching process, and thereafter the inner circumferential edge-side thin part 15 is formed in another etching process. Additionally, in the forming of the inner circumferential edge-side thin part 15, etching is not performed on the portion of the top foil piece 60 in which the valley part-side thin part 16 is formed, but is selectively performed only on a portion thereof different from the valley part-side thin part 16.

When the rotary shaft 1 is rotated in order to operate the thrust bearing having the above configuration and a thrust load is added to the thrust bearing, the top foil piece 60 is pushed onto the back foil piece 21, and the inclination angle θ of the top foil piece 60 decreases. At this time, in the thrust bearing 3A(3), since the circumferential speed at the outer circumferential edge side of the thrust collar 4 is greater than that at the inner circumferential edge side thereof, the pressure (film pressure) of the fluid lubrication film at the inner circumferential edge side at which the circumferential speed is low decreases, and the top foil piece 60 receives a reaction force from the back foil piece 21 and may easily rise toward the thrust collar 4.

However, in this embodiment, since the inner circumferential edge-side thin part 15 is formed in the inner circumferential edge side of the top foil piece 60, the inner circumferential edge side easily bends compared to the outer circumferential edge side thereof. In addition, since a gap is formed between the inner circumferential edge side and the back foil piece 21 (the bump foil piece) due to the inner circumferential edge-side thin part 15, the inner circumferential edge side is easily pushed onto the back foil piece 21. At this time, in the inner circumferential edge side, a force by the back foil piece 21 which pushes back the top foil piece 60 onto the thrust collar 4 does not easily occur because the gap is formed therein. Thus, it is possible to prevent the inner circumferential edge side of the top foil piece 60 from easily rising toward the thrust collar 4 due to the lower circumferential speed at the inner circumferential edge side of the thrust collar 4 in this thrust bearing than that at the outer circumferential edge side thereof. That is, the inner circumferential edge side of the top foil piece 60 does not easily rise toward the thrust collar 4.

Even when the inner circumferential edge side of the top foil piece 60 is pushed onto the back foil piece 21 and the above gap is eliminated, since the resilient force (the reaction force which the top foil piece 60 receives from the back foil piece 21) of the inner circumferential edge side of the back foil piece 21 is decreased in accordance with the gap compared to that of the outer circumferential edge side thereof, as described above, the inner circumferential edge side does not easily rise toward the thrust collar 4.

Thus, even when the thrust load further increases and the thickness of the fluid lubrication film further decreases, the top foil piece 60 does not easily contact the thrust collar 4, and as a result, it is possible to support a high thrust load.

In the thrust bearing of this embodiment, the inner circumferential edge-side thin part 15 thinner than the outer circumferential edge side of the top foil piece 60 is formed on the inner circumferential edge side thereof, the inner circumferential edge side easily bends, and a gap is formed between the inner circumferential edge side and the back foil piece 21. Therefore, it is possible to prevent a force by the back foil piece 21 which pushes back the inner circumferential edge side of the top foil piece 60 onto the thrust collar 4 from easily occurring. Thus, it is possible to prevent the inner circumferential edge side of the top foil piece 60 from easily rising toward the thrust collar 4 due to the lower circumferential speed at the inner circumferential edge side of the thrust collar 4 than that at the outer circumferential edge side thereof, to prevent the top foil piece 60 from approaching and contacting the thrust collar 4, and thereby to prevent a decrease in the lifetime of the bearing and seizure thereof.

Additionally, in this embodiment, although each of the fixed part-side thin part 14, the inner circumferential edge-side thin part 15 and the valley part-side thin part 16 is formed, the present disclosure is not limited thereto, and the top foil piece 11 of the first embodiment may be provided with the inner circumferential edge-side thin part 15 of this embodiment. In addition, only the inner circumferential edge-side thin part 15 of this embodiment and the valley part-side thin part 16 of the second embodiment may be formed in a top foil piece.

Next, a thrust bearing of a fourth embodiment of the present disclosure is described.

Figure 6A:
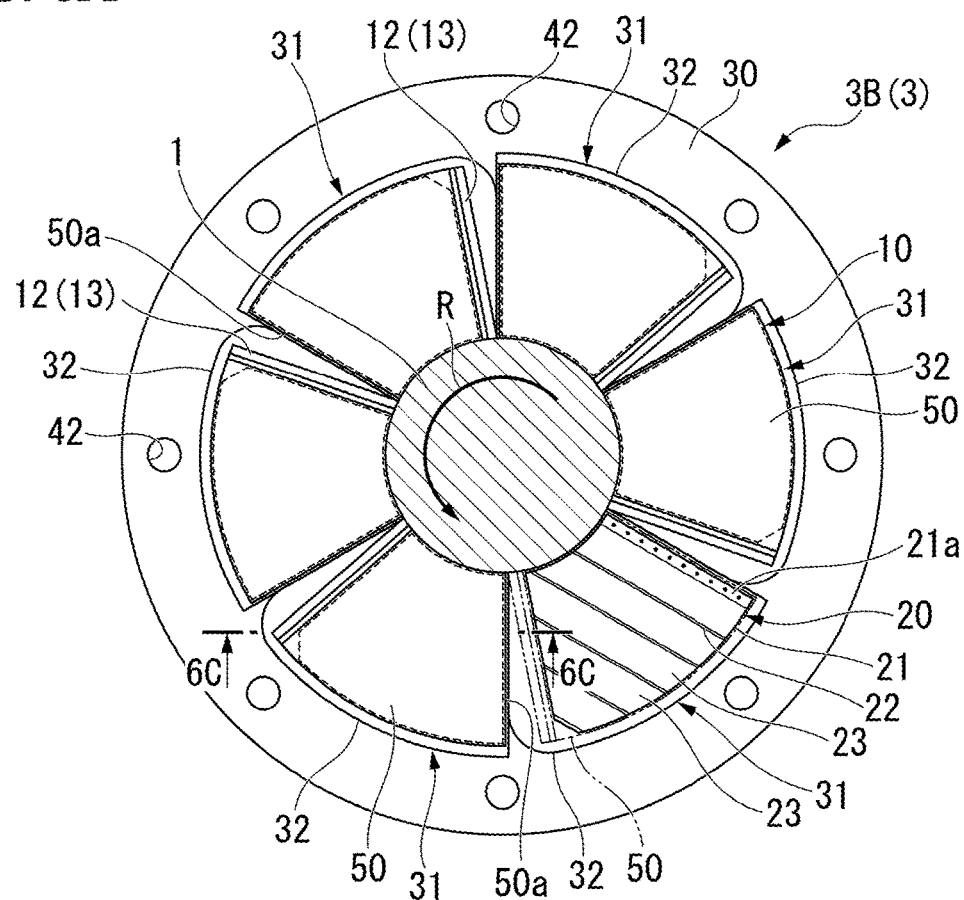
FIG. 6A is a view showing a thrust bearing of a fourth embodiment of the present disclosure, and is a partial cross-sectional plan view of the thrust bearing.
Figure 6B:
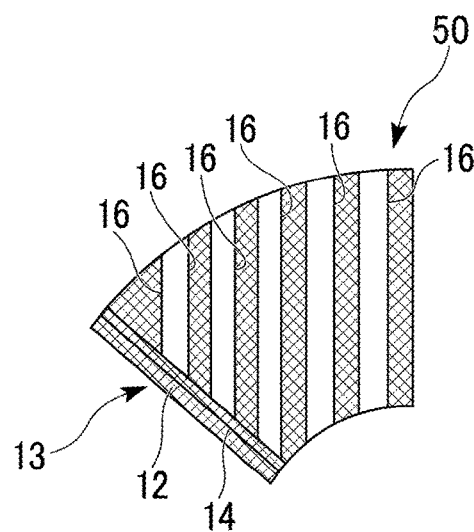
FIG. 6B is a plan view showing the rear surface of a top foil piece.
Figure 6C:
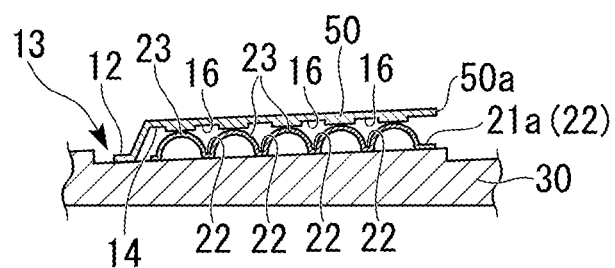
FIG. 6C is a cross-sectional view taken along 6C-6C line in FIG. 6A.
Figure 6D:
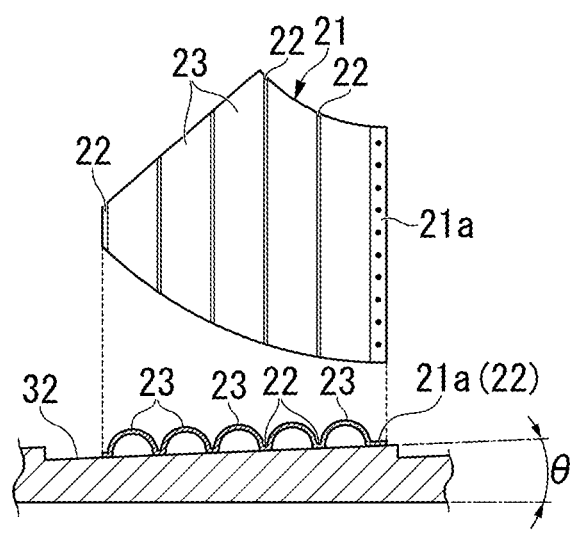
FIG. 6D is an explanatory view in which a plan view and a side view of a bump foil piece correspond to each other in order to show the shape of the bump foil piece.

Main differences of a thrust bearing 3B(3) of the fourth embodiment from the thrust bearing of the second embodiment are that as shown in FIGS. 6A to 6D, an inclined surface 32 is formed in the support area 31 of the base plate 30, and the heights of all the peak parts 23 of the back foil piece 21 are the same. FIG. 6A is a partial cross-sectional plan view of the thrust bearing 3. FIG. 6B is a plan view showing the rear surface of a top foil piece 50. FIG. 6C is a cross-sectional view taken along 6C-6C line in FIG. 6A. FIG. 6D is an explanatory view in which a plan view and a side view of a bump foil piece correspond to each other in order to show the shape of the bump foil piece.

In this embodiment, as shown in FIG. 6A, the entire area supporting the back foil piece 21 and the top foil piece 50 used for the second embodiment within the support area 31 is provided with the inclined surface 32 whose height gradually increases from the fixed edge 12 side toward an edge 50a on the trailing side of the top foil piece 50. That is, as shown in FIG. 6C, the inclined surface 32 is formed to be inclined in a direction orthogonal to the edge 50a.

The back foil piece 21 is formed in a wave sheet shape in which valley parts 22 contacting the base plate 30 and peak parts 23 contacting the top foil piece 50 are alternately arranged similarly to the first embodiment. However, in this embodiment, as shown in FIGS. 6C and 6D, all the peak parts 23 are formed to have the same height.

The valley parts 22 and the peak parts 23 are arranged in a direction crossing with the fixed edge 12 of the top foil piece 50 in plan view similarly to the above embodiments. That is, the arrangement direction of the valley parts 22 and the peak parts 23 is set to be a direction crossing with the fixed edge 12, and is set to be the same as the inclination direction of the inclined surface 32. Accordingly, the height of the positions of the tops of the peak parts 23 of the back foil piece 21 gradually increases at a constant rate in the inclination direction of the inclined surface 32 of the base plate 30, namely toward the trailing side of the back foil piece 21 in the rotation direction of the rotary shaft 1. That is, the positions of the tops of the peak parts 23 are apparently the same as those in the first embodiment or the second embodiment. Thus, the inclination angle θ of the top foil piece 50 placed on the back foil piece 21 is formed to be similar to that in the first embodiment. In this embodiment, as shown in FIG. 6D, the inclination angle θ of the top foil piece 50 is determined by the inclination angle θ of the inclined surface 32.

In the thrust bearing 3B(3) of this embodiment, since the fixed part-side thin part 14 is also formed in the top foil piece 50 as shown in FIG. 6B, when a load is added to the bearing, a portion of the top foil piece 50 close to the edge 50a can easily and smoothly move. Thus, the optimum inclination angle of the top foil piece 50 can be easily obtained even after the rotary shaft 1 starts rotating, and the load capability of the bearing improves.

Since the valley part-side thin parts 16 are formed, if a sheet material thicker than that in the related art is used for forming the top foil piece 50, while the bending easiness in the circumferential direction can be maintained to be equivalent to that in the related art, the top foil piece 50 does not easily bend in the radial direction, and the flexure of the intermediate portion thereof toward the back foil 20 can be limited. Thus, it is possible to prevent the load capability from deteriorating due to a decrease in the pressure of the fluid lubrication film at the intermediate portion in the radial direction.

In this embodiment, although each of the fixed part-side thin part 14 and the valley part-side thin part 16 is formed, the present disclosure is not limited thereto, and a top foil piece provided with one of the fixed part-side thin part 14 and the valley part-side thin part 16 may be combined with the base plate 30 of this embodiment including the inclined surface 32. In addition, the top foil piece 50 of this embodiment may be provided with the inner circumferential edge-side thin part 15 of the third embodiment.

According to the first aspect of the present disclosure, the thin part extending from the outer circumferential edge to the inner circumferential edge or to the side edge of the top foil piece is formed by removing a part from the surface of the top foil piece facing the back foil piece. Therefore, since the top foil piece easily bends at the thin part, the top foil piece easily bends in a range from the leading side to the trailing side thereof in the rotation direction of the rotary shaft, namely in the circumferential direction. On the other hand, since the top foil piece is almost not influenced in the radial direction by the thin part, the bending difficulty (the bending rigidity) thereof is almost not changed, and is maintained to be equivalent to that before the thin part is formed. Thus, if a sheet material thicker than that in the related art is used for forming the top foil piece, while the bending easiness in the circumferential direction is maintained to be equivalent to that in the related art, the top foil piece does not easily bend in the radial direction compared to the related art, and the flexure of the intermediate portion of the top foil piece toward the back foil can be limited.

According to the second aspect of the present disclosure, the thin part includes the fixed part-side thin part which is formed in the fixed part and in the vicinity of the fixed part on the trailing side of the fixed part in the rotation direction of the rotary shaft and which extends from the outer circumferential edge to the inner circumferential edge of the top foil piece. Therefore, if a sheet material thicker than that in the related art is used for forming the top foil piece as described above, the top foil piece does not easily bend particularly in the radial direction compared to the related art, and the flexure of the intermediate portion of the top foil piece toward the back foil can be limited.

Since a portion on the trailing side of the top foil piece in the rotation direction of the rotary shaft can easily and smoothly move due to the fixed part-side thin part, for example, in a case where the thrust collar is interposed between a pair of top foils, the starting torque of the rotary shaft decreases. In addition, after the rotary shaft starts rotating, since the top foil piece easily and smoothly moves, the optimum inclination angle of the top foil piece can be easily obtained, and the load capability of the bearing improves.

According to the third aspect of the present disclosure, since the thin part includes the valley part-side thin part, if a sheet material thicker than that in the related art is used for forming the top foil piece as described above, the top foil piece does not easily bend particularly in the radial direction compared to the related art, and the flexure of the intermediate portion of the top foil piece toward the back foil can be limited. In addition, since the top foil piece easily bends due to the valley part-side thin part in a range from the leading side to the trailing side of the top foil piece in the rotation direction of the rotary shaft, namely in the circumferential direction, the inclination angle of the top foil piece easily becomes the optimum inclination angle thereof, and the load capability of the bearing improves.

According to the fourth aspect, the bump foil piece can resiliently support the top foil piece. In addition, the height of the top foil piece can be changed in accordance with the peak parts of the bump foil piece whose height is changed.

According to the fifth aspect, when the top foil piece is arranged on the inclined surface via the back foil piece, the height of the top foil piece can be accurately changed in accordance with the inclined surface. Additionally, in this case, it is sufficient that the back foil piece is formed to have a constant height without changing the height thereof, and thus the machining cost thereof can be limited.

According to the sixth aspect, the bump foil piece can resiliently support the top foil piece. In addition, since the ridge line of the peak part closest to the edge on the trailing side of the bump foil piece is disposed to be parallel to the supported surface of the thrust collar, the edge on the trailing side of the top foil piece supported by this peak part always can be easily disposed to be parallel to the thrust collar.

According to the seventh aspect, in order to increase the pressure of the fluid lubrication film formed at the top foil piece at the small side of the bearing clearance, namely at the trailing side of the bearing clearance in the rotation direction of the rotary shaft, the trailing side in the rotation direction of the top foil piece can be supported by a high rigidity, and thereby the load capability of the bearing can be improved.

Hereinbefore, although embodiments of the present disclosure have been described with reference to the attached drawings, the present disclosure is not limited to the above embodiments. The shape, the combination or the like of each component shown in the above embodiments is an example, and additions, omissions, replacements, and other modifications of a configuration based on a design request or the like can be adopted within the scope of the present disclosure.

For example, in the above embodiments, the back foil 20 and the top foil 10 are formed of six back foil pieces 21 (bump foil pieces) and of six top foil pieces 11, respectively, and thus six support areas 31 are formed (set) in the base plate 30 in order to correspond thereto. However, the number of the back foil pieces 21 (bump foil pieces) or the top foil pieces 11 may be 5 or less, or 7 or more as long as the number is a number greater than one. In this case, the number of the support areas 31 is also adjusted to be the same as that of the back foil pieces 21 (bump foil pieces) or the top foil pieces 11.

A structure in which the fixed part-side thin part 14 is removed from the top foil piece 50 shown in FIG. 4A, namely a structure in which only the valley part-side thin parts 16 are formed, can also be used for a top foil piece of the present disclosure.

Additionally, in the fourth embodiment, although the top foil piece 50 of the second embodiment is used for a top foil piece, instead of this, the top foil piece 11 of the first embodiment or the top foil piece 60 of the third embodiment can be used therefor.

In the fourth embodiment, in a case where the inclined surface 32 is formed in the support area 31 of the base plate 30, instead of a structure in which the entire surface supporting the back foil piece 21 is provided with the inclined surface 32, the surface may be provided with an inclined surface and a flat surface (a surface parallel to the supported surface of the thrust collar 4), and part of the back foil piece 21 may be disposed on the inclined surface and the other thereof may be disposed on the flat surface. In this case, the flat surface may be formed on the upper side (at a position close to the edge 11a, at a position close to the thrust collar 4) of the inclined surface, or may be formed on the lower side (at a position close to the fixed edge 12) thereof. Furthermore, the flat surface may be formed on each of two sides of the inclined surface in the circumferential direction.

In addition, various configurations other than the above embodiments can be adopted with respect to the shape of the top foil piece or the bump foil piece, the arrangement of the top foil piece or the bump foil piece on the support area, the inclination direction of the inclined surface, or the like.

INDUSTRIAL APPLICABILITY

The present disclosure can be used for a thrust bearing which is disposed facing a thrust collar provided on a rotary shaft and supports the thrust collar.

The invention claimed is:

1. A thrust bearing disposed so as to face a thrust collar provided on a rotary shaft, the thrust bearing comprising:
   a top foil disposed so as to face the thrust collar;
   a back foil disposed so as to face a surface of the top foil opposite to another surface of the top foil facing the thrust collar, and supporting the top foil; and
   an annular plate-shaped base plate disposed on a side of the back foil opposite to the top foil, and supporting the back foil;
   wherein the back foil includes a plurality of back foil pieces arranged in a circumferential direction of the base plate,
   wherein the top foil includes a plurality of top foil pieces disposed on the plurality of back foil pieces, and
   wherein a leading side of a top foil piece in a rotation direction of the rotary shaft is provided with a fixed part fixed to the base plate, the top foil piece is provided with a thin part in which a part is removed from a surface of the top foil piece facing a back foil piece, and the thin part extends from an outer circumferential edge to an inner circumferential edge or to a side edge of the top foil piece.

2. The thrust bearing according to claim 1,
   wherein the thin part includes a fixed part-side thin part formed in the fixed part and in a vicinity of the fixed part on a trailing side of the fixed part in the rotation direction of the rotary shaft and extending from the outer circumferential edge to the inner circumferential edge of the top foil piece.

3. The thrust bearing according to claim 2,
   wherein the fixed part includes a linear fixed edge positioned at a trailing side of the fixed part in the rotation direction of the rotary shaft,
   wherein the back foil piece is formed of a wave sheet-shaped bump foil piece in which peak parts and valley parts are alternately formed, and is disposed so that an arrangement direction of the peak parts crosses with the fixed edge, and wherein the thin part includes a valley part-side thin part formed in a portion of the top foil piece facing a valley part and formed so as to be thinner than a portion of the top foil piece facing a peak part.

4. The thrust bearing according to claim 3, wherein the peak parts are formed so that the height of the peak parts gradually increases from the fixed edge side toward a trailing side of the back foil piece in the rotation direction of the rotary shaft.

5. The thrust bearing according to claim 3, wherein an edge on a trailing side of the bump foil piece in the rotation direction of the rotary shaft is fixed to the base plate.

6. The thrust bearing according to claim 1, wherein the fixed part includes a linear fixed edge positioned at a trailing side of the fixed part in the rotation direction of the rotary shaft, wherein the back foil piece is formed of a wave sheet-shaped bump foil piece in which peak parts and valley parts are alternately formed, and is disposed so that an arrangement direction of the peak parts crosses with the fixed edge, and wherein the thin part includes a valley part-side thin part formed in a portion of the top foil piece facing a valley part and formed so as to be thinner than a portion of the top foil piece facing a peak part.

7. The thrust bearing according to claim 6, wherein the peak parts are formed so that the height of the peak parts gradually increases from the fixed edge side toward a trailing side of the back foil piece in the rotation direction of the rotary shaft.

8. The thrust bearing according to claim 6, wherein an edge on a trailing side of the bump foil piece in the rotation direction of the rotary shaft is fixed to the base plate.

9. The thrust bearing according to claim 1, wherein support areas of the base plate, support areas of the base plate support the back foil pieces, each of the support areas is provided with an inclined surface whose height gradually increases from the fixed edge side toward an edge on a trailing side of the top foil piece in the rotation direction of the rotary shaft.

10. The thrust bearing according to claim 9, wherein the back foil piece is formed of a wave sheet-shaped bump foil piece in which peak parts and valley parts are alternately formed, and is disposed so that an arrangement direction of the peak parts is the same as an inclination direction of the inclined surface.

* * * * *